(No Model.)
J. KELLY.
STOP AND WASTE COCK.
No. 256,222.  Patented Apr. 11, 1882.
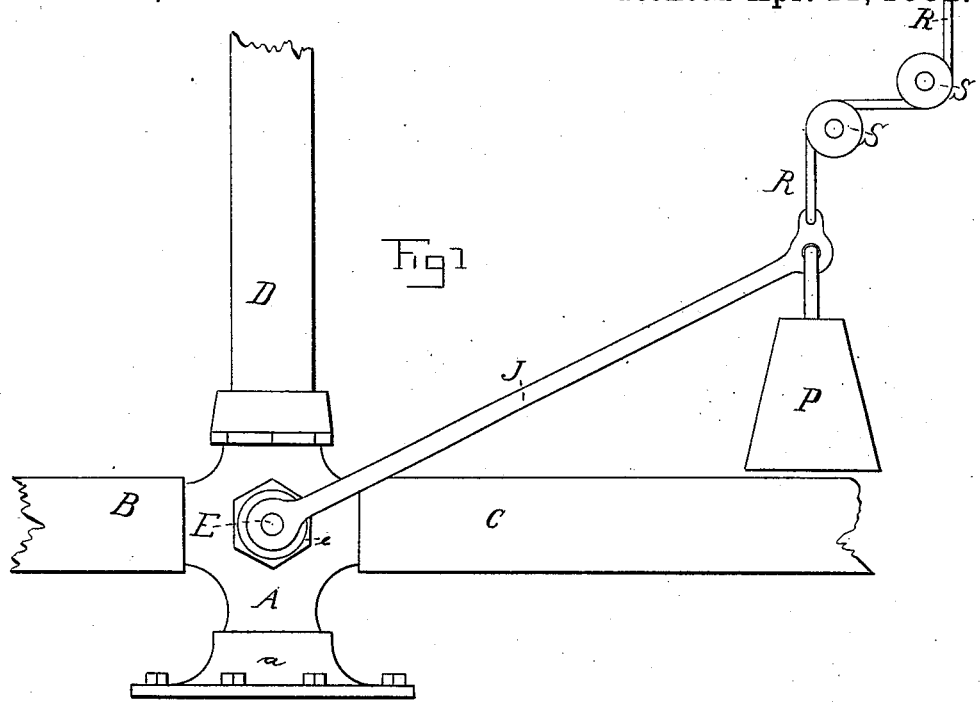
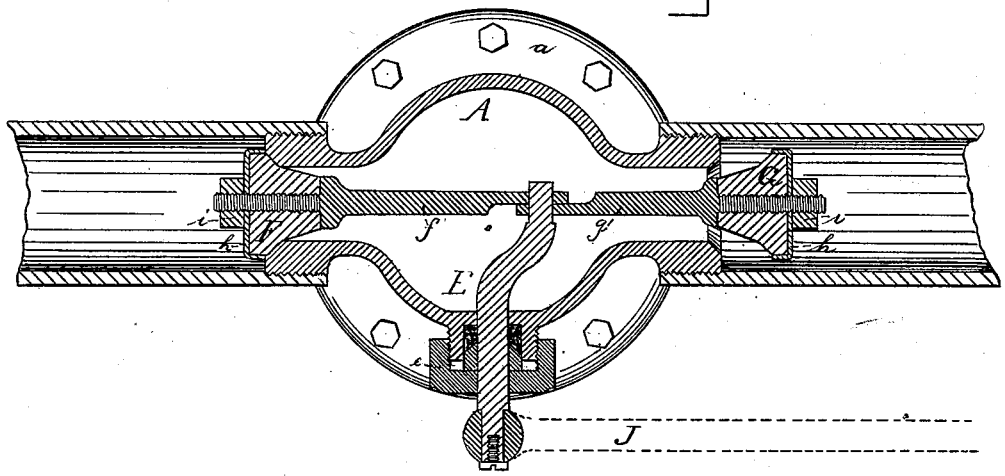
WITNESSES
F. W. Adams
F. W. Kuschagen
INVENTOR
John Kelly
By Wm H Lotz
Attorney

UNITED STATES PATENT OFFICE.

JOHN KELLY, OF CHICAGO, ILLINOIS, ASSIGNOR OF TWO-THIRDS TO THOMAS KELLY AND JAMES KELLY, OF SAME PLACE.

STOP AND WASTE COCK.

SPECIFICATION forming part of Letters Patent No. 256,222, dated April 11, 1882.

Application filed January 6, 1882. (No model.)

*To all whom it may concern:*

Be it known that I, JOHN KELLY, of Chicago, in the county of Cook and State of Illinois, have invented certain new and useful Improvements in Stop and Waste Cocks; and I do hereby declare that the following is a full, clear, and exact description thereof, reference being had to the accompanying drawings, and to the letters of reference marked thereon, which form a part of this specification.

This invention relates to cocks or faucets for shutting off the water-supply in houses; and it is my object to produce such a cock that will overcome the objections heretofore experienced with the common stop-cock.

My invention consists in the peculiar novel devices and combinations of devices embodied in my stop and waste cock, as fully hereinafter explained, and pointed out by the claims.

In the accompanying drawings, Figure 1 represents an elevation of my stop-cock in combination with the lever-and-weight arrangement for operating the valves, and Fig. 2 a horizontal section through the center of the stop-cock on an enlarged scale.

Like letters designate corresponding parts in all the figures.

A denotes the valve-casing, having a foot, $a$, for securing it with a series of wood-screws upon a board or timber. This casing has three screw-necks for coupling the service-pipe B, that is connected with the water-main in the street, the waste-pipe C, that connects with the sewer, and the upright pipe D, that connects with the several branches leading to the faucets and valves in the rooms of the house.

E is a crank, the shank of which is passed through a stuffing-box, $e$, in the side of the casing A.

The ends of the openings in the screw-necks that couple with the pipes B and C are conically chamfered for forming valve-seats.

Two conical valves, F and G, made of rubber or other suitable elastic material, are secured against a shoulder upon the screw ends of two valve-rods, $f$ and $g$, each by a metallic cap, $h$, and a nut, $i$. To the opposite ends of these valve-rods $f$ and $g$ are eyes that are passed over the end of crank E. Valve F is to reciprocate in pipe B, and valve G is to reciprocate in pipe C, and the distance between both valves F and G is more than that between their seats in the ends of the screw-necks, so that one valve must be open while the other one is closed. The valve-rods $f$ and $g$ are of such difference in length that when the crank E is turned to a nearly horizontal direction the valve F is against its seat and shuts off the water and the valve G is open, and vice versa when the valve is turned about one-eighth of a revolution.

Upon the exterior end of the shank of crank E is rigidly secured a lever, J, by which the crank is operated. To the end of this lever J is suspended a weight, P, and to the lever J is also secured the end of a rope or cord, R, that is passed over as many sheaves or pulleys S as may be necessary for leading it to any desired position in the upper floor of the building. By means of this cord R and weight P the valves are operated—that is, by raising the weight, and thereby turning the lever J and crank E until the valve G is pressed against its seat, the valve F will be open and the water from pipe B will flow into pipe D, and by releasing the cord R the weight P will turn the lever J downward, whereby the crank will close the valve F against its seat and will open the valve G, when the water-supply will be shut off, and the water contained in the several branch pipes in the house will escape through pipe C into the sewer, with which it is to be connected.

Heretofore the stop-cocks for houses were made with a solid brass plug that had to be turned from an upper floor by the torsional resistance of a long rod passed through one or several stories in the building. These plugs, when not worked for a long time, will stick very tight in their shell or casing, so as to be almost impossible to move without twisting off the rod. Besides that, the sand or grit contained in the water will work between the joints and will cut the metal, so as to wear the cock to leak within a very limited time. With my arrangement these objections are entirely overcome, since an elastic valve will not be affected by the grit, and since by the reciprocating movements of the valves no extra friction can be caused for operating them. These former stop-cocks also had a very small vent only, that was opened for draining the pipes in the house by shutting off the water-supply, and did allow said water to flow into the ground under the house. The disadvantage of this was that the ground around said valves was always saturated with water, and was therefore a better conductor of cold and more apt to cause the water in the pipes to freeze, besides that the slow drainage of the water would frequently allow the water to freeze in the pipes before it could entirely escape. With my arrangement I have as large an escape-opening for the water as for the inlet-pipe, so as to allow the water to empty quickly, and instead of allowing said water to run into the ground I lead it into the sewer.

The advantages of my improvement for operating the valves by a lever or cord and weight over the former arrangement will be readily understood by every one experienced in the former difficulties. In this case the water can be shut off at night with surety from the uppermost floor of the building by simply releasing the rope, when the weight will be free to drop, and thereby will close the supply-valve and open the escape-valve.

What I claim is—

1. The stop-cock herein described, consisting of casing A, that forms a connection between the pipes B, C, and D, in combination with crank E, reciprocating the conical elastic valves F and G, all being constructed and arranged substantially as set forth.

2. The combination, with the casing A, having base a, screw-necks for coupling pipes B, C, and D, and stuffing-box e, of crank E, valve-rods f and g, and elastic conical valves F and G, the whole being constructed and arranged substantially as described and shown.

3. The combination, with the casing A, valves F and G, and crank E, of lever J, weight P, and cord R, the whole being arranged to operate substantially as shown and specified.

In testimony that I claim the foregoing as my invention I affix my signature in presence of two witnesses.

JOHN KELLY.

Witnesses:
F. W. KASEHAGEN,
ROBERT VIERLING.